Dec. 2, 1969    F. S. COPPOLA    3,481,413
SCALE WITH INDEX MEANS FOR DETERMINING CHANGES IN VOLUME
OF A MATERIAL
Filed Dec. 4, 1967
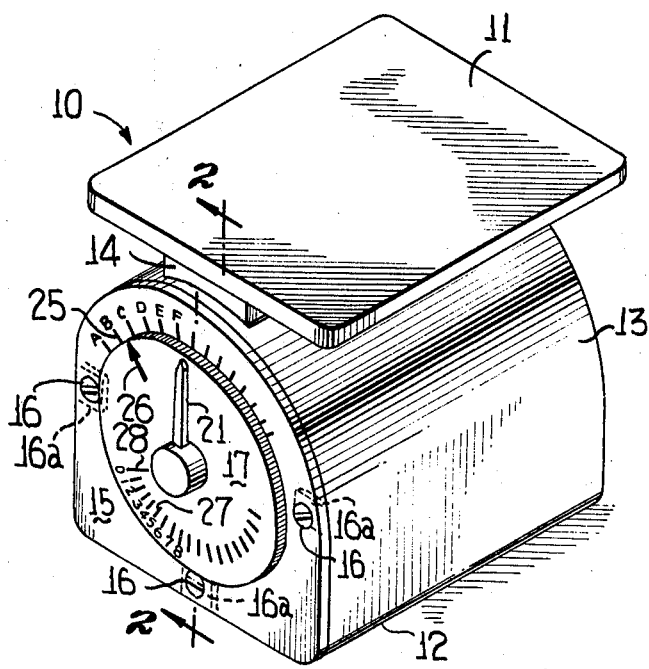
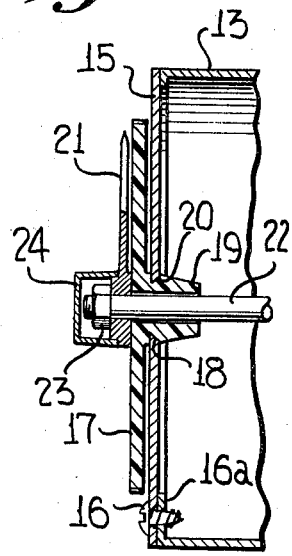
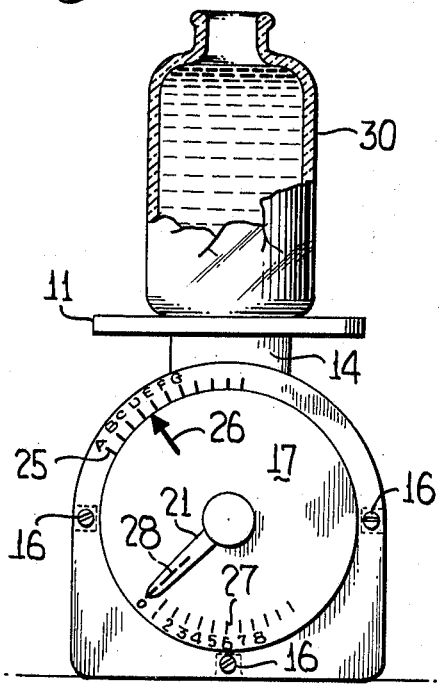
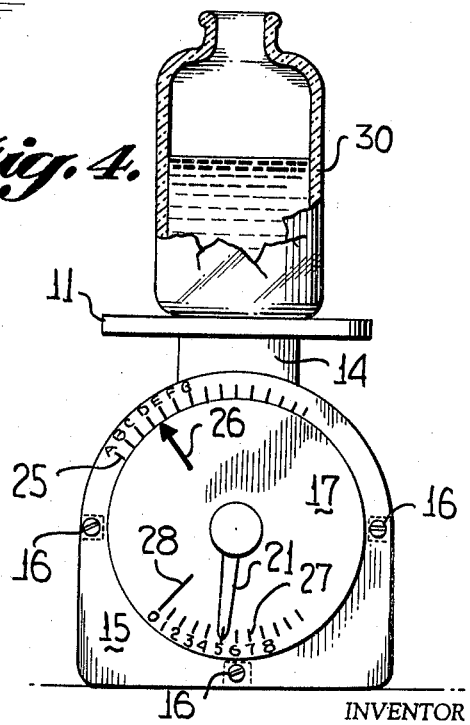
INVENTOR
Francis S. Coppola
BY Lowry & Rinehart
ATTORNEYS

United States Patent Office 3,481,413
Patented Dec. 2, 1969

3,481,413
SCALE WITH INDEX MEANS FOR DETERMINING CHANGES IN VOLUME OF A MATERIAL
Francis S. Coppola, 754 S. Main St., Elmira, N.Y. 14904
Filed Dec. 4, 1967, Ser. No. 687,686
Int. Cl. G01g 23/14
U.S. Cl. 177—173                     5 Claims

ABSTRACT OF THE DISCLOSURE

A scale having an index plate means for determining individual portions that have been removed from containers. The scale includes a front panel having indicia and the index plate means has an indicia which is specially calibrated for determining a specific change in volume of the material placed on the scale platform.

BACKGROUND OF THE INVENTION

There are many types of apparatus which are employed to determine the volume of contents removed from a container. Usually, the particular container is provided with a scale from which the removed contents is determined by having to read the scale before and after removal of a portion of the contents. There have been other attempts to produce a special calibration for a sensitive spring-balanced scale which can be used for the counting of individual portions that have been removed from a partially filled container. These particular calibrations have usually related to a dollars and cents value of the container's contents. This has generally necessitated a complex type of calibration scale and has therefore made that particular type of calibration difficult to use. Generally, the scales that have been used in the prior art require two readings to ascertain the volume change within said container. The taking of two readings necessarily introduces possible error in the determination of the change of the container contents. Furthermore, if the particular calibration is not in volume measurement, any calculations necessary to change the calibrations to a volume reading would introduce the possibility of additional error.

For the above reasons, an object of the instant invention is to provide a scale which facilitates the determining of the change of volume of a material in a particular container.

Another object of the present invention is to provide a simple calibration index on a scale for the sole purpose of counting specified size portions removed from a container.

Another object of the invention is to provide a scale having a fixed front panel on which is located indicia for determining a quantitative value for the starting value of material in the container being weighed. This starting value is indicated by a marker that is placed on a rotatable index plate.

A further object of this invention is to provide a scale having a rotatable index plate including a set of indicia which are calibrated in terms of volumetric measurements. In addition, the rotatable index plate carries a marker which is located at another point removed from the said indicia for the purpose of marking the initial quantitative value on the indicia of the front panel of the scale.

An additional object is to provide an index apparatus which is readily employed with known weighing devices to determine the volumetric variation of a previously weighed container.

A further object of this invention is to provide a rotatable index plate which is inexpensive to make and easily adaptable to any spring scale for the purpose of determining a change in individual volume portions within a container.

The above objects are accomplished by providing any known spring scale with a front panel which includes a set of indicia having a predetermined calibration in combination with a rotatable index plate having an indicator mark to read the said indicia of the front panel. In addition, at another position on the said rotatable index plate, a second set of indicia having a calibrated scale with respect to predetermined volumetric quantities is provided. A set line is placed on the zero point of the set of indicia on the index plate. A container is first placed upon the platform of the scale and the set line at the zero location of the index plate indicia is placed directly behind the hand of the spring scale that is responding to the weight of the said container. At the positioning of the set line behind the said hand, the individual marker that is located at another point on the said rotatable index plate is thereby correspondingly positioned at a particular point on the calibrated set of indicia located on the front panel of the said scale. The particular value indicated on the set of indicia of the front panel by said marker is recorded on the container. Subsequently, after the contacts of the container have been varied, the container is again placed on the platform of the spring scale with the said marker of the rotatable index panel being placed at the same location on the set of indicia of the front panel as is noted on the container itself. Because the weight of the container and its contents has changed, the hand of the scale will be offset from the originally located set line located at the zero point of the indicia of the rotatable index plate. The set of indicia on said index plate is so calibrated that the difference in volume may be read directly. There is an absolute elimination of any mathematical computation in the determination of the particular change in volume.

BRIEF DESCRIPTION OF THE DRAWINGS

The above and other objects and features of the invention will appear more fully hereinafter from a consideration of the following description taken in connection with the accompanying drawings wherein one specific embodiment of the invention is illustrated by way of example.

Referring to the drawings:

FIGURE 1 is a perspective view of a scale constructed in accordance with this invention;

FIGURE 2 is a sectional view along line 2—2 of FIGURE 1, illustrating the attachment between the front panel of the said scale and a rotatable index plate;

FIGURE 3 shows a filled container placed on the platform of a scale of this invention with the set line established behind the hand of the scale; and FIGURE 4 illustrates a subsequent placing of the same container on the platform after some of the liquid material has been removed from it.

DESCRIPTION OF A SPECIFIC EMBODIMENT

Referring specifically to the drawings, a scale generally designated 10 includes a rectangular base 12 and inverted U-shaped housing 13 formed integrally with base 12 and rear cover (not shown) which joins the base 12 and the U-shaped housing 13 at their rear extremities. A support structure 14 at the upper end of the housing 13 is supportive of a platform 11 which carries the container or object to be measured.

Platform 11 is positioned above the scales and is operatively connected to a threaded shaft 22 run into the spring (not shown) to cause rotation of the shaft 22 in response to a mass carried by the platform 11. Any desired connection between the platform 11 and the shaft 22 may be made by the man having ordinary skill in the art. The particular mechanism for moving the spring when placing a mass on the platform is not a part of the instant invention. A hand 21 is threaded on the shaft 22 and positioned by a lock nut 23.

The front of scale 10 is closed by a fixed panel 15 which is attached to the housing 13 by a suitable number of bracket 16a and a corresponding number of screws 16 which extend through the fixed panel 15 and engage the brackets 16a. The upper portion of the fixed panel 15 is provided with an annular extending letter scale 25.

An index plate 17 has a conical section 19 which extends through an opening 18 of the fixed panel 15. An annular recess 20 in the conical section 19 of the index plate 17 is positioned at the hole 18. The setting of the index plate 15 within the hole 18 and around the shaft 22 is such that the said index plate 17 is rotatable.

The lower portion of the index plate 17 carries a numerical index 27 on which is located a set line 28 at the zero position of said index 27. In addition, the plate 17 carries a marker 26 which is juxtaposed to the indicia 25 located on the fixed front panel 15. This marker 26 is employed to establish an index number for an initially weighed container as explained hereinafter.

The employment of an annular set of indicia 25 on the fixed panel 15 and an annular set of indicia 27 at a different radial disposition located on the index plate 17 eliminates the possibility of reading the wrong set of indicia. In addition, the chance of error is reduced through the use of two different markers such as the front panel indicia marker 26 located on the index plate 17 and the set line 28 located on the index plate 17 at the zero position of the numerical index 27.

The operation of the scale involves the placing of a container 30 on the platform 11, causing the hand 21 to rotate in a clockwise direction. After the hand 21 has come to rest, the index plate 17 is rotated to position the set line 28 along the center line of hand 21. This positions the hand 21 at the zero location of the index plate 27. When the set line 28 has been positioned behind the hand 21, the index marker 26 is in line with indicia of the set of indicia 25 on the fixed panel 15. A letter index indicated on the set of indicia 25 indicates a letter index that is to be recorded on the container 30.

FIGURE 4 shows the same container 30 after some of the contents have been removed. The volume of the material removed from the container 30 may be readily ascertained by placing the container 30 again onto the platform 11. This time the index plate 17 is rotated to position indicia marker 26 to read the same letter index indicia on the set of indicia 25 that has been recorded on the initially weighed container 30. This location of the marker 26 locates the index plate 17 at its original position of weighing of the container 30. The hand 21 does not rotate as far as it did in the first instance since some of the material of container 30 has been removed. It is seen that the hand 21 rests at a numerical quantity on the set of indicia 27 of the index plate 17. It is specifically noted at this point that the set of indicia 27 is calibrated to read volumetric portions. In addition, because the set line is located at the zero point of the set of indicia 27, the difference in portions may be read directly. This eliminates any possibility of error through mathematical computation. The fractional ounces and the weight of the empty container need not be considered while ascertaining the amount of fluid removed from or remaining in the bottle.

While this invention has been shown with reference to a very specific embodiment, it is obvious to those skilled in the art that it is susceptible to various other changes and modifications.

I claim:
1. An apparatus for determining the volume of material removed from a container comprising:
    (a) a platform for placing a mass to be measured;
    (b) a fixed front panel carrying a first set of indicia;
    (c) a movable hand;
    (d) means for deflecting said movable hand in response to said mass being placed on said platform;
    (e) an index plate carrying a second set of indicia and a mark for reading an indicia of said first set;
    (f) said second set of indicia having volumetric calibrations and a set line marker; and
    (g) means for moving said index plate with respect to said movable hand and said first set of indicia, whereby when said mass is placed on said platform, said index plate is moved to align said set line marker with said hand to establish an index value registered with said mark on said first set of indicia, thereby facilitating a subsequent determination in volume variation of said mass by returning said mark to the index value position and reading the displacement of the hand from said set line marker.

2. Apparatus as defined in claim 1, wherein said fixed panel includes an aperture and wherein said hand extends through said aperture.

3. Apparatus as defined in claim 1, wherein said index plate is disc-shaped and rotatably mounted with respect to said fixed panel.

4. Apparatus as defined in claim 3, wherein said sets of indicia are annularly disposed.

5. A method for determining the change in volume of a varying mass of material comprising:
    (a) providing a scale having a plaform, a fixed front panel carrying a first set of indicia, a movable hand, a means for deflecting said movable hand in response to a mass being placed on said plaform, an index plate carrying a second set of indicia and a mark for reading values on said first set of indicia, said second set of indicia having volumetric calibrations and a set line marker, and means for moving said index plate with respect to said movable hand and said first set of indicia;
    (b) placing a mass of material to be measured on said platform and allowing said movable hand to come to rest;
    (c) moving said index plate to align said set line marker with said movable hand which has come to rest;
    (d) marking said mass with the indicia notation registered with the mark for reading the indicia of the said first set;
    (e) varying the volume of said mass to form a second mass having a different volume;
    (f) placing said second mass on the platform of said scale and allowing said movable hand to come to rest;
    (g) moving said index plate to register said mark with the indicia of said first set at the position recorded on the said mass during the marking step; and
    (h) recording the quantitative value registered with the said movable hand on the said second set of indicia, thereby to read directly the change in volume of said mass.

References Cited
UNITED STATES PATENTS

| | | | |
|---|---|---|---|
| 1,278,788 | 9/1918 | Theobald | 177—173 |
| 1,371,371 | 3/1921 | Hinsman | 116—129 |
| 1,407,987 | 2/1922 | Crane | 177—166 |
| 1,537,158 | 5/1925 | Chatillon | 116—129 |
| 2,559,493 | 7/1951 | Bird | 116—129 |
| 3,228,488 | 1/1966 | Coppola | 177—173 |

FOREIGN PATENTS

| | | |
|---|---|---|
| 267,214 | 3/1927 | Great Britain. |
| 575,951 | 3/1946 | Great Britain. |

ROBERT S. WARD, JR., Primary Examiner

U.S. Cl. X.R.

177—166; 116—129